(12) United States Patent
Koba et al.

(10) Patent No.: US 11,148,395 B2
(45) Date of Patent: Oct. 19, 2021

(54) HIGH-STRENGTH HOT-DIPPED STEEL SHEET HAVING EXCELLENT COATING ADHESION AND METHOD FOR MANUFACTURING SAME

(71) Applicant: JFE STEEL CORPORATION, Tokyo (JP)

(72) Inventors: Masaki Koba, Tokyo (JP); Yusuke Fushiwaki, Tokyo (JP); Yasunobu Nagataki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 16/480,428

(22) PCT Filed: Jan. 10, 2018

(86) PCT No.: PCT/JP2018/000247
§ 371 (c)(1),
(2) Date: Jul. 24, 2019

(87) PCT Pub. No.: WO2018/139191
PCT Pub. Date: Aug. 2, 2018

(65) Prior Publication Data
US 2020/0009833 A1    Jan. 9, 2020

(30) Foreign Application Priority Data
Jan. 25, 2017   (JP) .............................. JP2017-010787

(51) Int. Cl.
*B32B 15/01*   (2006.01)
*C22C 38/14*   (2006.01)
(Continued)

(52) U.S. Cl.
CPC ............ *B32B 15/013* (2013.01); *B32B 15/01* (2013.01); *B32B 15/012* (2013.01); *B32B 15/04* (2013.01);
(Continued)

(58) Field of Classification Search
CPC ..... B32B 15/01; B32B 15/012; B32B 15/013; B32B 15/04; B32B 15/043; B32B 15/18;
(Continued)

(56) References Cited

U.S. PATENT DOCUMENTS 6,309,762 B1    10/2001   Speckert
2015/0184273 A1    7/2015   Makimizu et al.
2017/0211164 A1    7/2017   Kimura et al.

FOREIGN PATENT DOCUMENTS

CN    102341521 A    2/2012
EP    2 436 797 A1   4/2012
(Continued)

OTHER PUBLICATIONS

Mar. 20, 2018 International Search Report issued in International Patent Application No. PCT/JP2018/000247.
(Continued)

*Primary Examiner* — Michael E. La Villa
(74) *Attorney, Agent, or Firm* — Oliff PLC

(57) ABSTRACT

There is provided a high-strength hot-dipped steel sheet having excellent coating adhesion and a method for manufacturing the steel sheet. The steel sheet has a chemical composition, and a coating layer is disposed on the steel sheet. The chemical composition includes, by mass %, C: 0.02% or greater and 0.30% or less, Si: 0.01% or greater and 2.0% or less, Mn: 0.2% or greater and 3.0% or less, P: 0.08% or less, S: 0.02% or less, and Al: 0.001% or greater and 0.40% or less, with the balance being Fe and incidental impurities. The coating layer has a coating weight per side
(Continued)

of 30 to 90 g/m² and contains exfoliated base steel in an amount of 0.3 to 1.5 g/m².

11 Claims, 1 Drawing Sheet

(51) Int. Cl.

| | | |
|---|---|---|
| *C22C 38/12* | (2006.01) | |
| *C22C 38/06* | (2006.01) | |
| *C22C 38/04* | (2006.01) | |
| *C22C 38/02* | (2006.01) | |
| *C22C 38/00* | (2006.01) | |
| *C21D 9/46* | (2006.01) | |
| *C21D 8/02* | (2006.01) | |
| *C21D 6/00* | (2006.01) | |
| *C23C 2/02* | (2006.01) | |
| *C23C 2/28* | (2006.01) | |
| *C23C 2/40* | (2006.01) | |
| *C23C 2/06* | (2006.01) | |
| *C23C 2/12* | (2006.01) | |
| *C23C 28/02* | (2006.01) | |
| *C23C 30/00* | (2006.01) | |
| *B32B 15/04* | (2006.01) | |
| *C23C 28/00* | (2006.01) | |
| *B32B 15/18* | (2006.01) | |
| *C21D 1/76* | (2006.01) | |

(52) U.S. Cl.
CPC ............ *B32B 15/043* (2013.01); *B32B 15/18* (2013.01); *C21D 6/005* (2013.01); *C21D 6/008* (2013.01); *C21D 8/0205* (2013.01); *C21D 8/0263* (2013.01); *C21D 9/46* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C23C 2/02* (2013.01); *C23C 2/06* (2013.01); *C23C 2/12* (2013.01); *C23C 2/28* (2013.01); *C23C 2/40* (2013.01); *C23C 28/025* (2013.01); *C23C 28/3225* (2013.01); *C23C 30/00* (2013.01); *C23C 30/005* (2013.01); *C21D 1/76* (2013.01); *C21D 8/0226* (2013.01); *C21D 8/0236* (2013.01); *C21D 8/0273* (2013.01); *Y10T 428/12757* (2015.01); *Y10T 428/12799* (2015.01); *Y10T 428/12951* (2015.01); *Y10T 428/12958* (2015.01); *Y10T 428/12965* (2015.01); *Y10T 428/12972* (2015.01)

(58) Field of Classification Search
CPC .......... C21D 1/76; C21D 6/005; C21D 6/008; C21D 8/0263; C21D 8/0205; C21D 8/0226; C21D 8/0273; C21D 8/0236; C21D 9/46; C23C 2/12; C23C 2/02; C23C 2/06; C23C 2/28; C23C 2/40; C23C 28/025; C23C 28/3225; C23C 30/00; C23C 30/005; C22C 38/00; C22C 38/001; C22C 38/002; C22C 38/02; C22C 38/04; C22C 38/06; C22C 38/12; C22C 38/14; Y10T 428/12757; Y10T 428/12799; Y10T 428/12951; Y10T 428/12958; Y10T 428/12965; Y10T 428/12972

See application file for complete search history.

(56) References Cited

FOREIGN PATENT DOCUMENTS

| | | |
|---|---|---|
| EP | 3 375 902 A1 | 9/2018 |
| JP | H10-81948 A | 3/1998 |
| JP | 2002-317257 A | 10/2002 |
| JP | 2010-196146 A | 9/2010 |
| WO | 2014/002428 A1 | 1/2014 |
| WO | 2016/013145 A1 | 1/2016 |

OTHER PUBLICATIONS

Jan. 7, 2020 Extended Search Report issued in European Patent Application No. 18745297.4.
Dec. 2, 2020 Office Action issued in Korean Patent Application No. 10-2019-7021210.
Dec. 25, 2020 Office Action issued in Chinese Patent Application No. 2018800080661.
May 6, 2021 Office Action issued in Korean Patent Application No. 10-2019-7021210.
Jul. 26, 2021 Office Action issued in Chinese Patent Application No. 2018800080661.
Aug. 5, 2021 Office Action issued in Korean Patent Application No. 10-2021-7022086.

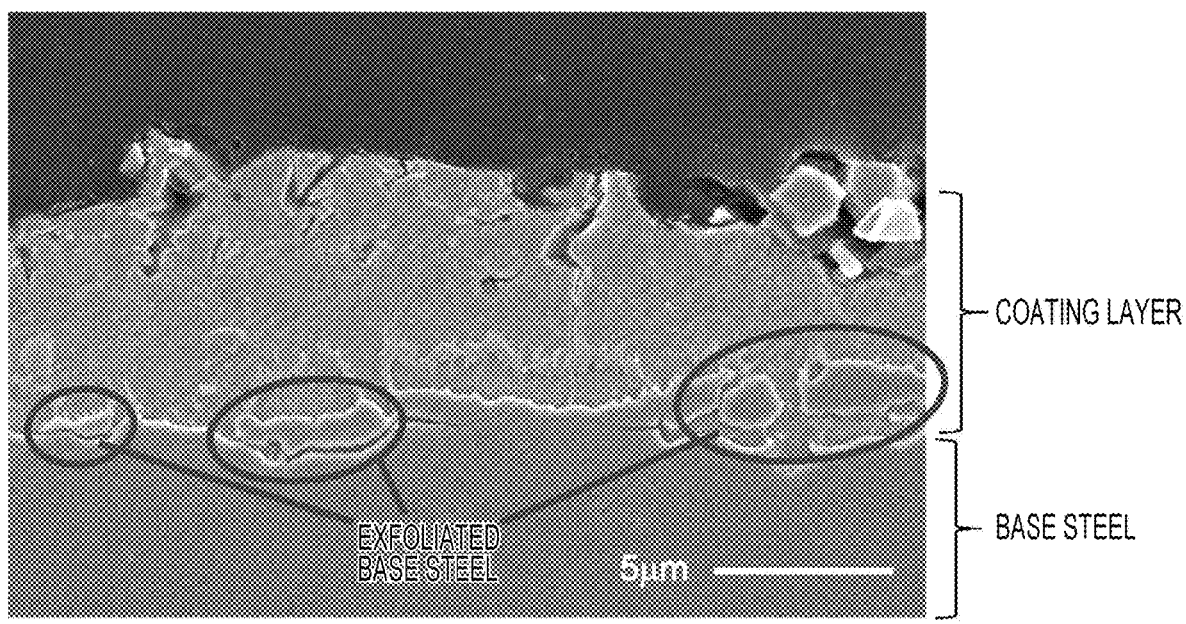

HIGH-STRENGTH HOT-DIPPED STEEL SHEET HAVING EXCELLENT COATING ADHESION AND METHOD FOR MANUFACTURING SAME

TECHNICAL FIELD

This application relates to a high-strength hot-dipped steel sheet having excellent coating adhesion and to a method for manufacturing the steel sheet. The base metal of the steel sheet is a high-strength steel sheet containing Si and Mn.

BACKGROUND

To date, in the fields of automotive steel sheets and the like, surface-treated steel sheets obtained by imparting corrosion protection properties to a base steel sheet have been used, and particularly, galvanized steel sheets and galvannealed steel sheets, which have excellent corrosion protection properties, have been used. In recent years, however, a thickness reduction and strength increase of steel sheets has been promoted to improve fuel economy and improve crashworthiness.

Typically, hot-dipped steel sheets are manufactured as follows. A steel sheet obtained by hot-rolling a slab or further by cold rolling is used as the base metal, and the base metal steel sheet is subjected to recrystallization-annealing in an annealing furnace of a CGL and thereafter subjected to hot-dip coating. Furthermore, alloyed hot-dipped steel sheets are manufactured by performing hot-dip coating and thereafter further performing alloying.

For hot-dipped steel sheets that are used for applications such as those described above, coating adhesion sufficient to withstand severe processing, such as a hole expansion processing, is very important, in addition to good surface appearance. However, hot-dipped steel sheets containing Si and Mn, which are oxidizable elements, tend to have defects such as bare spots and non-alloyed portions, and moreover, have deteriorated coating adhesion, as a result of formation of Si and Mn oxides in the surface of the steel during recrystallization annealing.

Several proposals have been made to solve the problems described above. For example, Patent Literature 1 proposes a method for improving powdering resistance. In the method, a Ni coating is applied to a steel sheet prior to heating, and subsequently, hot-dip coating is performed.

Patent Literature 2 proposes a method for improving the adhesion of a coating film. In the method, a base metal is subjected to surface grinding, heated to 600° C. or higher in a reducing atmosphere, and cooled. The base metal is subjected to hot-dip coating and then to alloying.

Patent Literature 3 proposes a method for manufacturing a galvannealed steel sheet. In the method, a hot-rolled steel sheet or an annealed cold-rolled steel sheet is subjected to light reduction rolling at a rolling reduction ratio of 1.0 to 20% and then to a low-temperature heat treatment in which the steel sheet is held at 520 to 650° C. for five seconds or more, and thereafter, the steel sheet is immersed in a hot-dip galvanizing bath containing, in mass %, Al in an amount of 0.01 to 0.18% and then subjected to alloying.

The method proposed in Patent Literature 1, however, requires a step of applying a Ni coating to the surface of a base metal prior to heating. The method proposed in Patent Literature 2 requires a grinding process. As such, in both Patent Literature 1 and Patent Literature 2, a costly and laborious process is required, and therefore, there has been a problem in that productivity decreases.

Furthermore, with the method proposed in Patent Literature 3, coating adhesion at a high level that sufficiently corresponds to high strength and processability that are required of current high-strength steel sheets has not been achieved, and therefore the method has not necessarily been beneficial for the corrosion resistance of processed portions.

CITATION LIST

Patent Literature

PTL 1: Japanese Unexamined Patent Application Publication No. 2010-196146
PTL 2: Japanese Unexamined Patent Application Publication No. 10-81948
PTL 3: Japanese Unexamined Patent Application Publication No. 2002-317257

SUMMARY

Technical Problem

The disclosed embodiments have been made in view of the above circumstances, and an object of the disclosed embodiments is to provide a high-strength hot-dipped steel sheet having excellent coating adhesion and a method for manufacturing the steel sheet.

Solution to Problem

The present inventors diligently performed studies to solve the problems described above. As a result, it was found that a high-strength hot-dipped steel sheet having excellent coating adhesion can be obtained by including exfoliated base steel in the coating layer.

The disclosed embodiments were made based on the above findings, and the features include the following.

[1] A high-strength hot-dipped steel sheet having excellent coating adhesion, the high-strength hot-dipped steel sheet including: a steel sheet having a chemical composition, and a coating layer disposed on the steel sheet, the chemical composition including, in mass %, C: 0.02% or greater and 0.30% or less, Si: 0.01% or greater and 2.0% or less, Mn: 0.2% or greater and 3.0% or less, P: 0.08% or less, S: 0.02% or less, and Al: 0.001% or greater and 0.40% or less, with the balance being Fe and incidental impurities, the coating layer having a coating weight per side of 30 to 90 g/m$^2$, wherein the coating layer contains exfoliated base steel in an amount of 0.3 to 1.5 g/m$^2$.

[2] The high-strength hot-dipped steel sheet having excellent coating adhesion according to [1], wherein the chemical composition further includes, in mass %, one or more of Ti: 0.01% or greater and 0.40% or less, Nb: 0.001% or greater and 0.200% or less, V: 0.001% or greater and 0.500% or less, Mo: 0.01% or greater and 0.50% or less, W: 0.001% or greater and 0.200% or less, and B: 0.0003% or greater and 0.01% or less.

[3] A method for manufacturing a high-strength hot-dipped steel sheet having excellent coating adhesion, wherein a steel slab having a chemical composition according to [1] or [2] is subjected to hot rolling, rolling at a rolling reduction ratio of 1 to 10%, and pickling, and subsequently, to rolling at a rolling reduction ratio of 0.3 to 5% and hot-dip coating.

[4] The method for manufacturing a high-strength hot-dipped steel sheet having excellent coating adhesion according to [3], wherein, in the hot rolling, finish rolling is performed after rough rolling, at a finish rolling temperature of 820° C. or higher, and subsequently, coiling is performed at a coiling temperature of 450 to 650° C.

[5] The method for manufacturing a high-strength hot-dipped steel sheet having excellent coating adhesion according to [3] or [4], wherein, after the rolling at a rolling reduction ratio of 0.3 to 5% and prior to the hot-dip coating, continuous annealing is performed in a furnace atmosphere having a hydrogen concentration of 2 to 30 vol % and a dew point of −60 to −10° C., with a steel sheet annealing end-point temperature being 600 to 950° C.

[6] The method for manufacturing a high-strength hot-dipped steel sheet having excellent coating adhesion according to any one of [3] to [5], wherein alloying is additionally performed after the hot-dip coating.

Note that the high-strength hot-dipped steel sheet of the disclosed embodiments is a steel sheet having a tensile strength (TS) of 590 MPa or greater and is obtained by performing hot-dip coating or hot-dip coating plus subsequent alloying, on a base metal, which is a hot-rolled steel sheet or a cold-rolled steel sheet. Furthermore, examples of coatings herein include Zn coatings, Zn—Al coatings, and Al coatings.

Advantageous Effects

The disclosed embodiments make it possible to obtain a high-strength hot-dipped steel sheet having excellent coating adhesion. Since the steel sheet exhibits high corrosion resistance even after processing, the steel sheet is effective for manufacturing a member having a complex shape, and, therefore, the disclosed embodiments provide a significant industrial advantage.

BRIEF DESCRIPTION OF THE DRAWINGS

FIG. 1 is an image showing a state of exfoliated base steel of a galvannealed steel sheet.

DETAILED DESCRIPTION

The disclosed embodiments will now be described in detail. In the following descriptions, the contents of the elements in the chemical composition of the steel and the contents of the elements in the chemical composition of the coating are all in mass % but are indicated simply with % unless otherwise specified. In addition, the hydrogen concentrations are all in vol % but are indicated simply with % unless otherwise specified.

According to the disclosed embodiments, a high-strength hot-dipped steel sheet having excellent coating adhesion includes a steel sheet and a coating layer disposed on the steel sheet. The steel sheet includes, in mass %, C: 0.02% or greater and 0.30% or less, Si: 0.01% or greater and 2.0% or less, Mn: 0.2% or greater and 3.0% or less, P: 0.08% or less, S: 0.02% or less, and Al: 0.001% or greater and 0.40% or less, with the balance being Fe and incidental impurities. The coating layer has a coating weight per side of 30 to 90 g/m². The coating layer contains exfoliated base steel in an amount of 0.3 to 1.5 g/m². That is, in the disclosed embodiments, exfoliated base steel is incorporated into the coating layer, thereby preventing propagation of cracks formed in the coating layer during processing and thus improving coating adhesion. As a result, the high-strength hot-dipped steel sheet having excellent coating adhesion is obtained.

First, the following describes reasons for the limitations on the chemical composition of the high-strength hot-dipped steel sheet having excellent coating adhesion, to which the disclosed embodiments are directed.

C: 0.02% or Greater and 0.30% or Less

The formability of a base metal improves as the C content decreases, but the presence of C increases the strength of the steel sheet inexpensively. Accordingly, the C content is greater than or equal to 0.02%. It is preferable that the C content not be less than 0.04%. On the other hand, the presence of an excessive amount of C reduces the toughness and weldability of the steel sheet, and therefore the C content is less than or equal to 0.30%. It is preferable that the C content not be greater than 0.20%.

Si: 0.01% or Greater and 2.0% or Less

Si is effective as a solid solution strengthening element and needs to be present in an amount of 0.01% or greater to increase the strength of the steel sheet. However, the presence of an excessive amount of Si degrades wettability for hot-dip coating and degrades reactivity for alloying, which makes adjustment of alloying difficult and results in a deterioration of coating appearance and coating adhesion. For these reasons, the Si content is 0.01% or greater and 2.0% or less.

Mn: 0.2% or Greater and 3.0% or Less

Mn is an element useful for increasing the strength of steel. To produce this effect, Mn needs to be present in an amount of 0.2% or greater. However, the presence of an excessive amount of Mn degrades wettability for hot-dip coating and degrades reactivity for alloying, which makes adjustment of alloying difficult and results in a deterioration of coating appearance and coating adhesion. For these reasons, the Mn content is 0.2% or greater and 3.0% or less. It is preferable that the Mn content be 0.3% or greater and 2.6% or less.

P: 0.08% or Less

If P is present in an amount greater than 0.08%, weldability deteriorates and surface quality deteriorates. Furthermore, alloying needs to be performed at an increased alloying temperature; otherwise, it is impossible to obtain a desired alloying degree. However, if the alloying temperature is increased, the ductility of the base metal steel sheet deteriorates and the adhesion of the alloyed hot-dipped layer deteriorates. Accordingly, the P content is less than or equal to 0.08%.

S: 0.02% or Less

Segregation of S at grain boundaries or formation of large amounts of MnS reduces toughness, and therefore the S content needs to be less than or equal to 0.02%. Accordingly, the S content is less than or equal to 0.02%. The lower limit of the S content is not particularly limited, and the content may be the level of that of impurities.

Al: 0.001% or Greater and 0.40% or Less

Al is added for the purpose of deoxidation of molten steel. If the content is less than 0.001%, the purpose is not achieved. On the other hand, if Al is present in an amount greater than 0.40%, large numbers of inclusions are formed, which causes a defect in the steel sheet. Accordingly, the Al content is 0.001% or greater and 0.40% or less.

The balance is Fe and incidental impurities.

In the disclosed embodiments, for the purpose described below, one or more of the following may be further included, in mass %, Ti: 0.01% or greater and 0.40% or less, Nb: 0.001% or greater and 0.200% or less, V: 0.001% or greater and 0.500% or less, Mo: 0.01% or greater and 0.50% or less, W: 0.001% or greater and 0.200% or less, and B: 0.0003% or greater and 0.01% or less.

Ti, Nb, V, Mo, W, and B are elements necessary to cause precipitation of precipitates (carbides, in particular) in the base metal steel sheet, and it is preferable to add one or more selected from the group consisting of these elements. In general, in many cases, these elements are present in the form of precipitates containing these elements, in the base metal steel sheet. Of these elements, Ti, in particular, is an element having a high precipitation-strengthening ability and being effective from a cost standpoint. If the amount of Ti added is less than 0.01%, however, the amount of precipitates in the base metal steel sheet necessary for ensuring that precipitates (carbides, in particular) are included in the alloyed hot-dipped layer may be insufficient. On the other hand, if the amount is greater than 0.40%, the effect no longer increases and the cost increases. Accordingly, when Ti is to be included, the Ti content is 0.01% or greater and 0.40% or less.

Likewise, when Nb, V, Mo, W, and B are to be included, the contents are as follows, for reasons similar to those for the upper limit and the lower limit of the range of the Ti content. The Nb content is 0.001% or greater and 0.200% or less, the V content is 0.001% or greater and 0.500% or less, the Mo content is 0.01% or greater and 0.50% or less, the W content is 0.001% or greater and 0.200% or less, and the B content is 0.0003% or greater and 0.01% or less.

Next, the coating layer will be described.

The coating layer has a coating weight per side of 30 to 90 g/m$^2$. If the coating weight is less than 30 g/m$^2$, ensuring corrosion resistance is difficult. On the other hand, if the coating weight is greater than 90 g/m$^2$, coating peel resistance deteriorates.

Furthermore, exfoliated base steel is included in the coating layer. This is an important requirement of the disclosed embodiments. Including exfoliated base steel in the coating layer prevents propagation of cracks formed in the coating layer during processing. In the case of hot-dip coatings, exfoliation of base steel causes the interface between the coating layer and the base steel to become non-smooth. It is believed that this inhibits propagation of cracks along the interface between the coating layer and the base steel, thereby improving adhesion. Furthermore, in the case of alloyed coating layers, for example, in a galvannealed coating, cracks typically propagate along the interface between the Γ phase and the δ phase or within the phases, but it is believed that cracking is inhibited when exfoliated base steel is included, in other words, when base steel, which is soft, is present in the alloyed coating layer, which is brittle.

The amount of exfoliated base steel to be included in the coating layer is 0.3 to 1.5 g/m$^2$. If the amount of exfoliated base steel included is less than 0.3 g/m$^2$, it is unlikely that a coating adhesion improvement effect is produced. On the other hand, if the amount is greater than 1.5 g/m$^2$, the coating weight becomes non-uniform, which degrades the appearance.

Note that "exfoliated base steel" corresponds to the portions encircled by the solid lines shown in FIG. 1 and are portions that are exfoliated and completely separated from the base steel and are incorporated into the coating layer.

The content of exfoliated base steel can be measured by using a method described in "Examples" below.

Next, a method for manufacturing the high-strength hot-dipped steel sheet having excellent coating adhesion of the disclosed embodiments will be described.

A steel slab having a chemical composition as described above is subjected to hot rolling, rolling at a rolling reduction ratio of 1 to 10%, and pickling, and subsequently, to rolling at a rolling reduction ratio of 0.3 to 5% and hot-dip coating. It is preferable that, in the hot rolling, finish rolling be performed after rough rolling, at a finish rolling temperature of 820° C. or higher, and subsequently, coiling be performed at a coiling temperature of 450 to 650° C. Furthermore, it is preferable that, after the rolling at a rolling reduction ratio of 0.3 to 5% and prior to the hot-dip coating, continuous annealing be performed in a furnace atmosphere having a hydrogen concentration of 2 to 30 vol % and a dew point of −60 to −10° C., with the steel sheet annealing end-point temperature being 600 to 950° C. Furthermore, alloying may be additionally performed after the hot-dip coating. In the disclosed embodiments, performing rolling prior to and after pickling is an important requirement. Specific conditions for performing rolling prior to and after pickling will be described later.

Hot Rolling

Hot Rolling Starting Temperature (Slab Heating Temperature) (Preferable Condition)

To disperse fine precipitates of Ti, Nb, and the like, it is necessary to first dissolve Ti, Nb, and the like in the steel sheet before performing hot rolling. Accordingly, it is preferable that the heating temperature prior to hot rolling (slab heating temperature) not be lower than 1100° C. On the other hand, if the slab is heated to higher than 1300° C., internal oxidation in a surface layer of the steel may be promoted, and consequently, surface condition may deteriorate. Accordingly, it is preferable that the slab heating temperature, prior to hot rolling, be 1100° C. or higher and 1300° C. or lower. It is more preferable that the slab heating temperature be 1100° C. or higher and 1200° C. or lower.

Finish Rolling Temperature (Preferable Condition)

It is preferable that the finish rolling temperature not be lower than 820° C. because deformation resistance for hot rolling can be reduced, thereby facilitating operation. On the other hand, if finish rolling is performed at a temperature higher than 1000° C., scale defects may tend to occur, which may result in a deterioration of surface condition. Accordingly, the finish rolling temperature is higher than or equal to 820° C. and is more preferably 820° C. or higher and 1000° C. or lower. It is more preferable that the finish rolling temperature be 850° C. or higher and 950° C. or lower.

Hot Rolling Coiling Temperature (Preferable Condition)

The steel sheet according to the disclosed embodiments contains oxidizable elements, examples of which include Si, Mn, and Ti. Accordingly, for inhibiting excessive oxidation of the steel sheet and ensuring good surface condition, a preferable coiling temperature is not higher than 650° C. On the other hand, if the coiling temperature is lower than 450° C., the coil tends to have poor condition due to uneven cooling, and, therefore, productivity may decrease. Accordingly, it is preferable that the hot rolling coiling temperature be 450° C. or higher and 650° C. or lower. It is more preferable that the hot rolling coiling temperature be 450° C. or higher and 600° C. or lower.

Rolling at Rolling Reduction Ratio of 1 to 10% After Hot Rolling Coiling and Prior to Pickling Hot-rolled steel sheets obtained through hot rolling and hot rolling coiling steps are subjected to pickling for descaling and thereafter to rolling. The pickling is not particularly limited and may be performed by using a known method. Here, in the disclosed embodiments, rolling is performed at a stage prior to pickling. Performing rolling at a stage prior to pickling is an important requirement of the disclosed embodiments. The rolling performed at a stage prior to pickling causes scales to be pressed against the surface of the steel sheet, thereby imparting suitable irregularities to the surface to facilitate incorporation of exfoliated base steel into the coating layer. The rolling reduction ratio is 1 to 10%. If the rolling reduction ratio is less than 1%, irregularities are not sufficiently imparted to the surface of the steel sheet, and it is therefore impossible to produce a sufficient coating adhesion improvement effect. On the other hand, if the rolling reduction ratio is greater than 10%, scales bite into the base steel, which significantly decreases descalability.

Rolling at Rolling Reduction Ratio of 0.3 to 5% After Pickling

In the disclosed embodiments, after pickling, rolling at a rolling reduction ratio of 0.3 to 5% is performed. Performing rolling at a rolling reduction ratio of 0.3 to 5% after pickling is an important requirement of the disclosed embodiments. With the reduction rolling, a surface topography is controlled, and, residual stress is introduced into the surface of the base metal. When the rolling reduction ratio is greater than or equal to 0.3%, residual stress is sufficiently introduced, and as a result, reactivity with a coating of the surface of the steel sheet is improved. If the rolling reduction ratio is greater than 5%, the effect of improving reactivity with a coating, which is produced by the introduction of strains, no longer increases, and in addition, the surface of the steel sheet becomes smooth, which makes incorporation of exfoliated base steel into the coating layer difficult.

Annealing (Preferable Condition)

It is preferable that annealing be performed after the rolling at a rolling reduction ratio of 0.3 to 5% and prior to hot-dip coating. Preferable conditions include a furnace atmosphere having a hydrogen concentration of 2 to 30 vol % and a dew point of −60 to −10° C. and a steel sheet annealing end-point temperature of 600 to 950° C. If the annealing end-point temperature is a temperature lower than 600° C., the oxide film after pickling cannot be completely reduced, and consequently, it may be impossible to obtain desired coating properties. Furthermore, if the temperature is higher than 950° C., Si, Mn, and the like are concentrated in the surface, which may degrade coatability. It is more preferable that the steel sheet annealing end-point temperature be 650° C. or higher and 850° C. or lower. It is preferable that the furnace atmosphere have a hydrogen concentration of 2 to 30% and a dew point of −60 to −10° C. It is sufficient that the furnace atmosphere be a reducing atmosphere, and an atmosphere having a dew point of −60 to −10° C., and a hydrogen concentration of 2 to 30%, the balance being an inert gas is suitable. If the dew point is higher than −10° C., Si oxide that is formed in the surface of the steel sheet tends to be in the form of a film. It is more preferable that the dew point not be higher than −20° C. On the other hand, dew points lower than −60° C. are industrially difficult to realize. If the hydrogen concentration is lower than 2%, reducibility is too low. When the hydrogen concentration is lower than or equal to 30%, a sufficient reducing ability is obtained. It is more preferable that the hydrogen concentration be 5% or higher and 20% or lower.

Hot-Dip Coating

Hot-dip coating is performed in a continuous hot-dip coating line by using a hot-dip coating bath, preferably after the annealing of the steel sheet in the reducing atmosphere. For example, the composition of the hot-dip coating bath is such that, in the case of hot-dip galvanizing, the Al concentration is within a range of 0.01 to 0.25% and the balance is Zn and incidental impurities. If the Al concentration is less than 0.01%, a Zn—Fe alloying reaction may occur during coating application and a brittle alloy layer may develop along the interface between the coating and the steel sheet (base metal), which degrades coating adhesion. If the Al concentration is greater than 0.25%, an Fe—Al alloy layer grows noticeably, which impairs coating adhesion. The temperature of the coating bath does not need to be particularly limited and may be 440° C. or higher and 480° C. or lower, which is a usual operation range.

Alloying (Preferable Condition)

If the alloying temperature is higher than 550° C., a Γ phase, which is hard and brittle, is formed noticeably at the interface between the steel sheet (base metal) and the coating film during alloying, and as a result, surface roughness increases and powdering resistance deteriorates. Accordingly, it is preferable that the alloying temperature not be higher than 550° C. It is more preferable that the alloying temperature not be higher than 530° C. On the other hand, if the alloying temperature is lower than 480° C., sufficient alloying is not achieved, and it is therefore impossible to obtain sufficient coating properties. Accordingly, it is desirable that the alloying temperature not be lower than 480° C.

It is preferable that the alloying time be 10 seconds or more and 60 seconds or less in consideration of problems associated with cost and control. It is more preferable that the alloying time not be more than 40 seconds.

In the alloying, the method for heating does not need to be particularly limited, and any of the methods known in the art, such as radiation heating, conduction heating, or high-frequency induction heating, may be used. After the alloying is carried out, the steel sheet is cooled to room temperature. Treatments after coating application do not need to be particularly limited, and it is possible to perform temper rolling to adjust the material, perform leveling or the like to make an adjustment for a planar shape, and, as necessary, perform a usual aftertreatment, such as chromating.

EXAMPLES

Next, the disclosed embodiments will be described in detail based on examples, but the disclosed embodiments are not limited to the examples.

Slabs having chemical compositions as shown in Table 1 were used. Casting was performed using a known method, and subsequently, under the conditions shown in Table 2, hot rolling, rolling, pickling, rolling, annealing, and hot-dip galvanizing were performed, and, for some of the samples, alloying was additionally performed.

For performing the hot-dip galvanizing, the temperature of the galvanizing bath was 460° C., and the coating weight was adjusted to 50 g/m$^2$ by wiping. The alloying was performed at an alloying temperature of 520° C.

Amount of Exfoliated Base Steel in Galvanized Layer

The amount of exfoliated base steel in the galvanized layer was measured using the following procedure by ICP emission spectrometry. First, the galvanized layer of the coated steel sheet was exclusively removed and dissolved by dissolving the galvanized layer in dilute hydrochloric acid containing an inhibitor added thereto. The inhibitor is an additive used to prevent excessive dissolution of the base steel and may be a commercially available inhibitor. In the disclosed embodiments, IBIT No. 700BK, which is a corrosion inhibitor for hydrochloric acid pickling manufactured by ASAHI Chemical Co., Ltd., was added to hydrochloric acid diluted 10 to 100 fold, such that the concentration of the inhibitor was 0.6 g/L. After dissolution of the coated steel sheet in dilute hydrochloric acid, a solution including undissolved exfoliated base steel was extracted and divided into two solutions. One of the solutions was subjected to composition analysis while the undissolved exfoliated base steel being with the solution, and the other of the solutions was subjected to composition analysis after redissolution by using hydrochloric acid containing no inhibitor. The amount of exfoliated base steel was determined as the difference between the results obtained.

The following tests were conducted on the galvanized steel sheets obtained as described above to measure a tensile strength and evaluate the surface appearance of the coating and coating adhesion. The methods for measurement and the evaluation criteria are described below.

Tensile Strength (TS)

A JIS No. 5 tensile test piece (JIS Z 2201) was cut from a galvanized steel sheet (GI) or a galvannealed steel sheet (GA) in a direction perpendicular to the rolling direction. TS was determined by conducting a tensile test in accordance with the specification of JIS Z 2241 at a strain rate of $10^{-3}$/s.

Appearance

Appearance after hot-dip coating and appearance after alloying were visually examined, and samples with no bare spots or alloying unevenness were rated as "○", and samples with bare spots and/or alloying unevenness were rated as "x".

Coating Adhesion

The coating adhesion of the galvanized steel sheet was evaluated by conducting a ball impact test. The ball impact test was conducted under the conditions including a ball weight of 2.8 kg and a drop height of 1 m. Tape applied to a processed portion was peeled off, and the presence or absence of peeling of the coating layer was visually determined.

○ No peeling of coating layer occurred
x Peeling of coating layer occurred

Powdering Resistance

The coating adhesion of the galvannealed steel sheet was evaluated by testing powdering resistance. Cellophane tape was applied to an alloyed hot-dipped steel sheet, bending at 90 degrees was applied to the taped surface, which was followed by bending-back, and then the tape was peeled off. On the basis of portions of the steel sheet adhering to the peeled tape, the amount of peeling of the coating per area of 10 mm×40 mm of a bent-back portion was measured by determining the number of Zn counts by using X-ray fluorescence. The amount was evaluated according to the following criteria.

| X-ray fluorescence count number | Rank |
|---|---|
| Less than 3000: | Excellent |
| 3000 or greater and less than 6000: | Good |
| 6000 or greater: | Poor |

TABLE 1

Mass %

| Steel sample | C | Si | Mn | P | S | Al | Ti | Nb | V | Mo | W | B | Notes |
|---|---|---|---|---|---|---|---|---|---|---|---|---|---|
| A | 0.065 | 0.10 | 1.60 | 0.008 | 0.0008 | 0.043 | 0.013 | 0.02 | 0.048 | 0 | 0 | 0 | Example |
| B | 0.070 | 0.25 | 1.20 | 0.005 | 0.0010 | 0.005 | 0.150 | 0 | 0 | 0 | 0.02 | 0 | Example |
| C | 0.100 | 0.45 | 2.30 | 0.010 | 0.0008 | 0.046 | 0.026 | 0.026 | 0.042 | 0.06 | 0 | 0 | Example |
| D | 0.080 | 0.65 | 1.45 | 0.015 | 0.0010 | 0.040 | 0.020 | 0.010 | 0 | 0 | 0 | 0.003 | Example |
| E | 0.070 | 1.30 | 1.70 | 0.005 | 0.0080 | 0.005 | 0.100 | 0.015 | 0 | 0.03 | 0 | 0.005 | Example |
| F | 0.085 | 2.10 | 2.12 | 0.008 | 0.0008 | 0.045 | 0.025 | 0.025 | 0.045 | 0.05 | 0 | 0 | Comparative example |
| G | 0.070 | 0.70 | 3.10 | 0.005 | 0.0010 | 0.005 | 0.150 | 0 | 0.150 | 0 | 0 | 0 | Comparative example |
| H | 0.070 | 0.25 | 1.40 | 0.005 | 0.0008 | 0.005 | 0 | 0 | 0.020 | 0 | 0.02 | 0 | Example |
| I | 0.065 | 0.15 | 1.55 | 0.008 | 0.0008 | 0.020 | 0 | 0 | 0 | 0 | 0 | 0 | Example |

TABLE 2

| No. | Steel sample used | Finish rolling temperature (° C.) | Coiling temperature (° C.) | Rolling reduction ratio prior to pickling (%) | Rolling reduction ratio after pickling (%) | Hydrogen concentration (vol %) | Dew point (° C.) | Steel sheet annealing end-point temperature (° C.) | Alloying | Tensile strength (TS) (MPa) | Amount of exfoliated base steel (g/m²) | Appearance | Coating adhesion | Powdering resistance | Notes |
|---|---|---|---|---|---|---|---|---|---|---|---|---|---|---|---|
| 1 | A | 850 | 450 | 3 | 0.5 | 10.1 | −35 | 750 | No | 720 | 0.6 | Good | Good | — | Example |
| 2 | A | 950 | 600 | 1 | 7 | 8.2 | −45 | 780 | Yes | 650 | 0.1 | Good | — | Poor | Comparative example |
| 3 | A | 920 | 500 | 3 | 1 | 10.1 | −30 | 620 | Yes | 785 | 0.6 | Good | — | Excellent | Example |
| 4 | A | 920 | 550 | 5 | 3 | 15.8 | −45 | 880 | Yes | 608 | 0.7 | Good | — | Excellent | Example |
| 5 | A | 950 | 580 | 2 | 0.5 | 11.5 | −25 | 980 | Yes | 596 | 0.5 | Good | — | Good | Example |
| 6 | A | 940 | 520 | 5 | 1 | 12.2 | −35 | 580 | Yes | 602 | 0.4 | Good | — | Good | Example |
| 7 | B | 850 | 420 | 0.3 | 4 | 9.8 | −35 | 800 | No | 802 | 0.2 | Good | Poor | — | Comparative example |
| 8 | B | 880 | 520 | 2 | 1 | 1.2 | −40 | 650 | No | 650 | 0.3 | Good | — | Good | Example |
| 9 | B | 920 | 500 | 5 | 0.5 | 9.8 | −20 | 700 | No | 695 | 0.4 | Good | Good | — | Example |
| 10 | B | 900 | 550 | 3 | 0.3 | 7.5 | −35 | 750 | Yes | 745 | 0.6 | Good | — | Excellent | Example |
| 11 | B | 900 | 600 | 3 | 1 | 12.2 | −50 | 850 | Yes | 832 | 0.8 | Good | — | Excellent | Example |
| 12 | B | 850 | 500 | 5 | 7 | 9.8 | −40 | 880 | Yes | 853 | 0.1 | Good | — | Poor | Comparative example |
| 13 | B | 950 | 620 | 3 | 0.5 | 9.8 | −40 | 750 | Yes | 746 | 0.9 | Good | — | Excellent | Example |
| 14 | B | 950 | 680 | 4 | 0.1 | 12.2 | −35 | 750 | Yes | 728 | 1.8 | Poor | — | Good | Comparative example |
| 15 | B | 800 | 480 | 0.1 | 4 | 10.1 | −35 | 850 | Yes | 805 | 0.1 | Good | — | Poor | Comparative example |
| 16 | C | 850 | 450 | 0.4 | 0.5 | 7.8 | −35 | 620 | No | 720 | 0.2 | Good | Poor | — | Comparative example |
| 17 | C | 940 | 480 | 5 | 0.3 | 10.1 | −35 | 720 | Yes | 789 | 0.3 | Good | Good | — | Example |
| 18 | C | 940 | 550 | 3 | 0.5 | 8.1 | −30 | 670 | Yes | 750 | 0.6 | Good | — | Excellent | Example |
| 19 | C | 980 | 480 | 5 | 0.5 | 10.1 | −45 | 750 | No | 805 | 0.3 | Good | Good | — | Example |
| 20 | D | 900 | 610 | 3 | 0.5 | 10.2 | −25 | 720 | Yes | 765 | 0.8 | Good | — | Excellent | Example |
| 21 | D | 850 | 480 | 3 | 1 | 12.5 | −50 | 780 | Yes | 802 | 0.3 | Good | — | Excellent | Example |
| 22 | D | 900 | 500 | 1 | 10 | 13.4 | −45 | 800 | Yes | 835 | 0.0 | Good | — | Poor | Comparative example |
| 23 | D | 940 | 550 | 13 | 0.3 | 12.5 | −40 | 700 | Yes | 725 | 1.6 | Poor | — | Good | Comparative example |
| 24 | E | 850 | 600 | 3 | 1 | 10.8 | −50 | 700 | No | 753 | 0.4 | Good | Good | — | Example |
| 25 | E | 900 | 550 | 2 | 0.5 | 10.2 | −50 | 720 | No | 768 | 0.5 | Good | Good | — | Example |
| 26 | E | 940 | 550 | 0.3 | 0.3 | 12.3 | −55 | 720 | Yes | 776 | 0.2 | Good | — | Poor | Comparative example |
| 27 | F | 920 | 450 | 2 | 1 | 12.3 | −45 | 750 | No | 920 | 0.3 | Good | Poor | — | Comparative example |
| 28 | F | 900 | 550 | 3 | 0.5 | 15.1 | −50 | 780 | No | 1050 | 0.6 | Good | Poor | — | Comparative example |
| 29 | G | 940 | 600 | 3 | 0.5 | 12.2 | −40 | 750 | Yes | 951 | 0.8 | Good | — | Poor | Comparative example |
| 30 | G | 900 | 550 | 3 | 1 | 10.8 | −40 | 800 | Yes | 886 | 0.4 | Good | — | Poor | Comparative example |
| 31 | H | 880 | 520 | 3 | 1 | 1.2 | −40 | 650 | Yes | 670 | 0.4 | Good | — | Good | Example |
| 32 | H | 920 | 500 | 5 | 0.5 | 9.8 | −35 | 700 | No | 713 | 0.4 | Good | Good | — | Example |
| 33 | A | 1050 | 580 | 2 | 1 | 10.8 | −25 | 850 | Yes | 629 | 0.5 | Good | — | Good | Example |
| 34 | E | 900 | 550 | 2 | 0.5 | 10.2 | −5 | 800 | Yes | 830 | 0.6 | Good | — | Good | Example |
| 35 | I | 920 | 500 | 3 | 1 | 10.1 | −30 | 650 | Yes | 760 | 0.6 | Good | — | Excellent | Example |

Table 2 demonstrates that Examples have good surface appearance and good coating adhesion (powdering resistance). In contrast, Comparative Examples are unsatisfactory in terms of at least one of surface appearance and coating adhesion (powdering resistance).

INDUSTRIAL APPLICABILITY

The high-strength hot-dipped steel sheet of the disclosed embodiments suitable for use in automotive parts, for which, in recent years, designing for increased strength and reduced thickness has been rapidly advanced.

The invention claimed is:

1. A high-strength hot-dipped steel sheet comprising:
    a base steel having a chemical composition comprising, by mass %: C: 0.02% or greater and 0.30% or less, Si: 0.01% or greater and 2.0% or less, Mn: 0.2% or greater and 3.0% or less, P: 0.08% or less, S: 0.02% or less, and Al: 0.001% or greater and 0.40% or less, with a balance being Fe and incidental impurities; and
    a coating layer disposed on the base steel, the coating layer having a coating weight per side in a range of 30 to 90 g/m$^2$ and containing exfoliated base steel in an amount in a range of 0.3 to 0.6 g/m$^2$,
    wherein an x-ray fluorescence count number of particles in the coating layer peeled from the base steel in a powdering resistance test is less than 3000.

2. The high-strength hot-dipped steel sheet according to claim 1, wherein the chemical composition further comprises, by mass %, at least one selected from the group consisting of Ti: 0.01% or greater and 0.40% or less, Nb: 0.001% or greater and 0.200% or less, V: 0.001% or greater and 0.500% or less, Mo: 0.01% or greater and 0.50% or less, W: 0.001% or greater and 0.200% or less, and B: 0.0003% or greater and 0.01% or less.

3. A method for manufacturing the high-strength hot-dipped steel sheet according to claim 1, wherein a steel slab having the chemical composition is subjected to hot rolling, rolling at a rolling reduction ratio in a range of 1 to 10%, and pickling, and subsequently, to rolling at a rolling reduction ratio in a range of 0.3 to 5% and hot-dip coating.

4. The method for manufacturing the high-strength hot-dipped steel sheet according to claim 3, wherein, in the hot rolling, finish rolling is performed after rough rolling at a finish rolling temperature of 820° C. or higher, and subsequently, coiling is performed at a coiling temperature in a range of 450 to 650° C.

5. The method for manufacturing the high-strength hot-dipped steel sheet according to claim 4, wherein, after the rolling at a rolling reduction ratio in the range of 0.3 to 5% and prior to the hot-dip coating, continuous annealing is performed in a furnace atmosphere having a hydrogen concentration in a range of 2 to 30 vol % and a dew point in a range of −60 to −10° C., with a steel sheet annealing end-point temperature being in a range of 600 to 950° C.

6. The method for manufacturing the high-strength hot-dipped steel sheet according to claim 5, wherein alloying is additionally performed after the hot-dip coating.

7. The method for manufacturing the high-strength hot-dipped steel sheet according to claim 4, wherein alloying is additionally performed after the hot-dip coating.

8. The method for manufacturing the high-strength hot-dipped steel sheet according to claim 3, wherein, after the rolling at a rolling reduction ratio in the range of 0.3 to 5% and prior to the hot-dip coating, continuous annealing is performed in a furnace atmosphere having a hydrogen concentration in a range of 2 to 30 vol % and a dew point in a range of −60 to −10° C., with a steel sheet annealing end-point temperature being in a range of 600 to 950° C.

9. The method for manufacturing the high-strength hot-dipped steel sheet according to claim 8, wherein alloying is additionally performed after the hot-dip coating.

10. The method for manufacturing the high-strength hot-dipped steel sheet according to claim 3, wherein alloying is additionally performed after the hot-dip coating.

11. The method for manufacturing the high-strength hot-dipped steel sheet according to claim 3, wherein the chemical composition further comprises, by mass %, at least one selected from the group consisting of Ti: 0.01% or greater and 0.40% or less, Nb: 0.001% or greater and 0.200% or less, V: 0.001% or greater and 0.500% or less, Mo: 0.01% or greater and 0.50% or less, W: 0.001% or greater and 0.200% or less, and B: 0.0003% or greater and 0.01% or less.

* * * * *